(12) United States Patent
Williamson et al.

(10) Patent No.: US 12,015,618 B2
(45) Date of Patent: Jun. 18, 2024

(54) SYSTEM AND METHOD OF SECURELY ESTABLISHING CONTROL OF A RESOURCE

(71) Applicant: SW7 VENTURES (H.K.) LIMITED, Hong Kong (HK)

(72) Inventors: Christopher Williamson, Hong Kong (HK); Roland Tegeder, London (GB); Mark Ryan, Birmingham (GB)

(73) Assignee: SW7 VENTURES (H.K.) LIMITED, Causeway Bay (HK)

( * ) Notice: Subject to any disclaimer, the term of this patent is extended or adjusted under 35 U.S.C. 154(b) by 196 days.

(21) Appl. No.: 17/689,853

(22) Filed: Mar. 8, 2022

(65) Prior Publication Data

US 2022/0294805 A1 Sep. 15, 2022

(51) Int. Cl.
*H04L 29/06* (2006.01)
*H04L 9/40* (2022.01)

(52) U.S. Cl.
CPC .................. *H04L 63/126* (2013.01)

(58) Field of Classification Search
CPC ....... H04L 63/126; H04L 9/3239; H04L 9/50; H04L 63/12; G06F 21/64
See application file for complete search history.

(56) References Cited

U.S. PATENT DOCUMENTS

| | | | |
|---|---|---|---|
| 10,666,445 B2 | 5/2020 | Qiu | |
| 2020/0005410 A1* | 1/2020 | McKee | G06F 16/2255 |
| 2020/0021590 A1* | 1/2020 | Jeuk | H04L 9/0637 |
| 2020/0097862 A1 | 3/2020 | Arora et al. | |
| 2020/0159889 A1 | 5/2020 | Chui et al. | |
| 2021/0056562 A1* | 2/2021 | Hart | G06F 16/27 |

(Continued)

FOREIGN PATENT DOCUMENTS

| | | |
|---|---|---|
| WO | WO 2018/170504 A1 | 9/2018 |
| WO | WO 2019/116492 A1 | 6/2019 |

(Continued)

OTHER PUBLICATIONS

Zamani et al.; "RapidChain: Scaling Blockchain via Full Sharding"; ACM SIGSAC Conf. on Computer and Communications Security; 2018; 31 pages.

(Continued)

*Primary Examiner* — Mahfuzur Rahman
(74) *Attorney, Agent, or Firm* — BakerHostetler (57) ABSTRACT

A computer-implemented method of and a system for securely establishing control of a resource in a distributed ledger is disclosed. The distributed ledger comprises a first shard instantiated on one or more first processor(s) of a first system. The first shard is configured to respond to an instruction originating from a first party. The distributed ledger further comprises a second shard instantiated on one or more second processor(s) and configured to respond to an instruction originating from a second party. The method comprises creating, by means of the publishing of a record by the first system, the resource, wherein the publishing of the record occurs in response to an instruction originating from the first party, wherein the publishing of the record is to the first shard of the ledger, and wherein the publishing of the record establishes that control of the resource resides with the second party.

20 Claims, 3 Drawing Sheets

(56) References Cited

U.S. PATENT DOCUMENTS

| | | | |
|---|---|---|---|
| 2021/0119764 A1* | 4/2021 | Meghji | H04L 9/3239 |
| 2022/0084013 A1* | 3/2022 | Kulkarni | G06Q 20/3825 |
| 2022/0294805 A1* | 9/2022 | Williamson | G06F 21/64 |

FOREIGN PATENT DOCUMENTS

| | | |
|---|---|---|
| WO | WO 2019/207501 A1 | 10/2019 |
| WO | WO 2020/041127 A1 | 2/2020 |
| WO | WO 2020/192948 A1 | 10/2020 |

OTHER PUBLICATIONS

Skidanov, Alexander; "The authoritative guide to Blockchain Sharding, part 1"; Near Protocol; Dec. 2018; 13 pages.

"Why doesn't Near just replicate Ethereum Serenity design"; Near Protocol; Nov. 2018; 6 pages.

"Technical Whitepaper"; Harmony Team; Version 2.0; Jan. 2020; 22 pages.

Li et al.; "PolyShard: Coded Sharding Achieves Linearly Scaling Efficiency and Security Simultaneously"; IEEE Transactions on Information Forensics and Security; vol. 16; Jan. 2020; 12 pages.

Fanti et al.; "Decentralized Payment Systems: Principles and Design"; The Distributed Technology Research and Foundation; Jan. 2019; 166 pages.

"The Zilliqa Technical Whitepaper"; The Zilliqa Team; Aug. 2017; 14 pages.

Kwon et al.; "Cosmos—A Network of Distributed Ledgers"; Whitepaper; 2019; 53 pages.

Dr. Gavin Wood; "Polkadot: Vison For A Heterogeneous Multi-Chain Framework"; Whitepaper; 2016; 21 pages.

Baker, Paddy; "Alibaba Claims Patented Cross-Chain System is Better Than Cosmos"; Tech; Jun. 2020; 4 pages.

Zamani et al.; "RapidChain: Scaling Blockchain via Full Sharding"; ACM SIGSAC Conf. on Computer and Communications Security; 2018; 38 pages.

Dang et al.; "Towards Scaling Blockchain Systems via Sharding"; Int'l Conf. on Management of Data; Mar. 2019; 16 pages.

Belchoir et al.; "A Survey on Blockchain Interoperability: Past, Present, and Future Trends"; ACM Computing Surveys; vol. 54; Mar. 2021; 63 pages.

Zamyatin et al.; "SoK: Communication Across Distributed Ledgers"; Int'l Conf. on Financial Cryptography and Data Security; 2021; 41 pages.

Asokan et al.; "Optimistic Fair Exchange of Digital Signatures"; IEEE Journal on Selected Areas in Communications; vol. 18; Aug. 1998; 23 pages.

Comit; https://comit.network/; accessed Feb. 8, 2023; 9 pages.

"ICO Review: Devv (DEV)"; Devvio; Jul. 2018; 14 pages.

Luu et al.; "A Secure Sharding Protocol For Open Blockchains"; ACM SIGSAC Conf. on Computer and Communications Security; 2016; p. 17-30.

Kokoris-Kogias et al.; "OmniLedger: A Secure, Scale-Out, Decentralized Ledger via Sharding"; IEEE Symposium on Security and Privacy; 2018; 16 pages.

Danezis et al.; "Centrally Banked Cryptocurrencies"; NDSS; arXiv:1505:06895; Dec. 2015; 15 pages.

Wang et al.; "Monoxide: Scale out Blockchains with Asynchronous Consensus Zones"; USENIX Symposium on Networked Systems Design and Implementation; Feb. 2019; 19 pages.

Brunjes et al.; "UTxO—vs account-based smart contract blockchain programming paradigms"; Int'l Symposium on Leveraging Applications of Formal Methods; Jul. 2020; p. 73-88.

\* cited by examiner

SYSTEM AND METHOD OF SECURELY ESTABLISHING CONTROL OF A RESOURCE

TECHNICAL FIELD

The present invention lies generally in the technical field of communications and information security. In particular, the present invention concerns a method of securely establishing control of a resource with a specified party.

BACKGROUND

In numerous everyday scenarios it is necessary to establish control of a resource with a specific party. In general, resources in the technical field of this invention are any data or data structures that provide those individuals or organisations who control any such resource with certain powers, rights, privileges, or further controls to the potential exclusion of other individuals or organisations. On occasion, the control of such data or data structures must be established with specific individuals or organisations.

One example is source code to a website or computer system. Such code are data that become a resource only when there is a means to establish a form of control over such data by controlling parties. Forms of such control may include but not be limited to read or write access privileges or the ability to direct revenues from a website to specific parties etc.

A further everyday example of the need to establish control of a resource with a specific party occurs during the preparation and distribution of an official document, such as an electronic vaccination pass or a theatre ticket. Typically, an electronic pass or a theatre ticket is created by or on behalf of a central authority or an official ticketing office, respectively, possibly after an application submitted by an individual or in a way that is initiated by the authority or office, or otherwise. Once the information supplied by the applicant or the issuance or granting processes of the authority have been checked, a data structure for the vaccination pass or theatre ticket is produced and control over it must then be instituted in favour of the applicant in order for the data or data structure to fulfil its utility and become a resource. The applicant thus becomes a holder of a vaccination pass, who may then travel across borders; or the applicant becomes a person with the right to attend a theatre show. In both these examples as well as numerous other ones, the person may have to supply his or her full name, possibly the date and location of birth, a photo, and various other pieces of potentially sensitive information, which he or she may not wish to disseminate widely. Whilst a vaccination pass or a theatre ticket is useful to the applicant who received this resource, it is not as useful to anyone who does not have control over such resources.

Another example of the need to establish control of a resource with a specific party occurs in geographically decentralised or distributed systems such as air traffic control operations where at any one time the traffic control of a certain flight sector or of a certain airplane in flight rests with a dedicated party before another party takes over, either at the end of a shift or as the flight moves on through the airspace.

Similar needs also arise in the decentralised control of electrical grid systems or certain distributed and cooperative military defence facilities. In each case, the establishing and transfer of certain controls between parties is subject to demands on security and finality of such transfer, among other aims.

There is a wide variety of prior art describing systems for distributing resources in the form of data or data structures and their associated controls. Continuing the examples of a vaccination pass or the theatre ticket, once these resources have been created, they are perhaps sent to the user's email address in order to be printed out by the user. Although such distribution systems are reasonably robust, perhaps relying on chains of custody, effective control over the resource passes through third-party hands before reaching the intended party. For example, if email is intercepted and the theatre ticket is printed out by someone else, effective control with the intended party is never established. There may also be delays in the transmission of the resource to the point that the resource becomes useless, such as when the theatre show takes place before the ticket is received, or when flight control is ceded to another control centre or official after the flight has already entered into another sector, possibly causing temporarily uncontrolled flight. Each of these shortcomings represents a significant risk to the secure transmission of resources and their associated controls.

In view of the above, there exists a need for a secure and low latency method of establishing control of a resource with a specific party that does not suffer from the disadvantages of prior art systems.

SUMMARY OF THE INVENTION

According to a first aspect of the present invention, there is provided a computer-implemented method of securely establishing control of a resource in a distributed ledger, wherein the distributed ledger comprises a first shard instantiated on one or more first processor(s) of a first system, the first shard configured to respond to an instruction originating from a first party, the distributed ledger further comprising a second shard, the second shard instantiated on one or more second processor(s), the second shard configured to respond to an instruction originating from a second party, the method comprising:
creating, by means of the publishing of a record by the first system, the resource,
wherein the publishing of the record occurs in response to an instruction originating from the first party,
wherein the publishing of the record is to the first shard of the ledger, and
wherein the publishing of the record establishes that control of the resource resides with the second party.

The method may further comprise the step of validating that the instruction originated from the first party, optionally wherein the validation is by the first system. The validation may be a check for a particular value of a parameter, database entry or ledger entry, or for the existence of a parameter, database entry or ledger entry, that indicates the origin of the instruction. These parameter, database entry or ledger entries may be compared to previously determined values.

The resource may comprise an indication of the identity of the second party (a person, group of people, company, organisation etc.). The indication may be a parameter, database entry or ledger entry that are created upon creation of the resource during the method. Such parameters may form part of the metadata within the entry on the distributed ledger.

The first shard may include one or more record(s) related to the first party. The second shard may include one or more record(s) related to the second party. In some instances, the first shard includes one or more record(s) related to the first party, and the second shard includes one or more record(s) related to the second party.

The method may further comprise indicating to the second party that control of the resource resides with the second party. The indicating to the second party that control of the resource resides with the second party may comprise sending a notification of the publishing of the record (and thereby of the establishment of control of the newly created resource) to the second party. The sending of the notification may be by the first system. In each case, the establishing of the resource as controlled by the second party precedes or is simultaneous with any such notification.

The one or more second processor(s) may be comprised in a second system. In such instances, the second system may search the record(s) in the first shard.

The method may be executed by the first system without interaction with any of the one or more processor(s) of the second shard.

The method may be executed exclusively by one or more processor(s) of the first shard.

The method may further comprise the step of verifying that the first party is authorized to instruct the creation of the resource. The method may further comprise the step of verifying that the first party is competent to instruct the creation of the resource. In some instances, the method comprises both verifying that the first party is authorized to instruct the creation of the resource and the step of verifying that the first party is competent to instruct the creation of the resource.

The first shard and the second shard of the distributed ledger may each exist in a shared memory space and the first system may be configured to access the shared memory space. The shard memory space may be a logical shared memory space.

The distributed ledger may comprise a blockchain.

The distributed ledger may be public.

According to a second aspect of the present invention, there is provided a computer program product comprising instructions that, when executed, cause one or more processor(s) to perform any of the methods described above.

According to a third aspect of the present invention, there is provided a computer-readable medium comprising instructions that, when executed, cause one or more processor(s) to perform any of the methods described above.

According to a fourth aspect of the present invention, there is provided a system for securely establishing control of a resource in a distributed ledger, wherein the distributed ledger comprises a first shard instantiated on one or more first processor(s) of a first system, the first shard configured to respond to an instruction originating from a first party, the distributed ledger further comprising a second shard, the second shard instantiated on one or more second processor(s), the second shard configured to respond to an instruction originating from a second party, the system comprising a first system configured to:
  create, by means of the publishing of a record, the resource,
  wherein the publishing of the record occurs in response to an instruction originating from the first party,
  wherein the publishing of the record is to the first shard of the ledger, and
  wherein the publishing of the record establishes that control of the resource resides with the second party.

BRIEF DESCRIPTION OF THE DRAWINGS

The present invention is described below with reference to the following figures, in which.

DETAILED DESCRIPTION

The following detailed disclosure outlines the features of embodiments of the present invention. In addition, some (but by no means all) variants of the embodiments that might be implemented whilst still falling under the scope of the present invention are also described.

The applications of the method and system for executing the method described herein are diverse. For ease of understanding and for brevity, the following detailed description includes some definitions and an overview, followed by a description of a scenario involving the establishment of control of a resource which involves a ticket (including a comparison with a prior art arrangement). Following that example, several further embodiments in which the present invention is equally advantageous are also briefly outlined. However, none of these individual scenarios is to be considered limiting, but rather is used as a context to outline the advantages of the present invention, and it is to be understood that the present invention will be applicable to other contexts that are not specifically outlined here.

Specific reference to the features shown in each of FIGS. 1 to 3 should be made in order to understand the principles of the present invention as outlined below. The present invention is nevertheless defined only by the appended claims.

Definitions

As used herein, by the term "distributed ledger" is meant a data structure, such as a database, that is able to be shared and/or is accessible by multiple parties, including by one or more of the first party and the second party. The access may be synchronized across multiple locations. The data structure may be established consensually. A distributed ledger may be either public, or private, or a combination thereof, depending on context, and may or may not operate using a shared memory space, such as a logically shared memory space.

As used herein, the term "shard" refers to a part of a data structure, such as in a distributed ledger. Typically, a first shard is instantiated on a processor or processors and a second shard is instantiated on a different processor or processors, in order to spread computational load or for other reasons. The computational load need not necessarily be evenly spread, nor need any two shards of the data structure be of the same size nor offer the same functionalities. In some instances, a shard is secure and/or encrypted to enable only certain authorised or designated parties to review that part of the data structure. In other instances, the shard may be viewable by anyone who cares to look. Still further, in some instances the shard may be viewable by anyone who cares to look, but some entries may be encrypted, or may be otherwise redacted or restricted such that the contents of those entries are restricted from view or from being revealed as plaintext. Whilst there are two shards in the examples below, there may be any number of shards in the present invention.

As used herein, by the term "resource" is meant a data object (such as but not limited to certain data within a data structure or the data structure itself) that is subject to control by a party for some use. The resource may comprise confidential information that needs to be kept secret. In certain contexts, a data object may be a resource to a certain party and not to another party. For example, a first party may have control over the resource while a second party acts as a custodian for it.

As used herein, by the term "creating" is meant the act of making something new that previously did not exist. The creation of a resource is not the modification of an existing resource, but rather the creation of a new resource that can co-exist with any other resources that have previously been created prior to and including the new resource's moment of creation.

As used herein, the phrase "instruction originating from a first party" means an instruction that has as its ultimate origin a first party. The instruction may be directly received from the first party. Alternatively, the first party may give the instruction indirectly via one or more intermediaries. Further alternatively, the first party itself may be an entity contracted or mandated to act on behalf of a further party, the first party having authority from that further party to act on its behalf.

As used herein, by the phrase "establishes that control of the resource resides with the second party" is meant that, as a result of the establishment, the second party is able to use and exercise the control over the resource and specifically the information and powers contained therein, at his or her discretion. Once control has been established, the second party may dictate when and how to use the resource, thereby exercising the specified control over the resource.

Overview

Embodiments of the present invention will now be described below that provide an improved system and method of securely establishing control of a resource with a second party, the methods being executed on a sharded distributed ledger.

In a communications and electronic systems control context, the method and system of the present invention reduce the inter-shard transmissions (i.e. the data traffic between shards) that are sent between the different shards within the architecture of the distributed ledger by eliminating the necessity for an inter-shard transmission in order for a first party to establish control of a resource with a second party. The absence of an inter-shard transmissions for the purpose of establishing control with a second party has several advantages, through reducing the computational requirements of preparing, sending, receiving and acknowledging in an atomically committed manner those transmissions, or through reducing the need to duplicate or cache data prior to establishing the control with a second party, even temporarily, on both a transmitting shard and on the receiving shard. Simultaneously, the network requirements and bandwidth that might be needed by an inter-shard transmissions are also reduced. Additionally, any delay that is introduced by the need to prepare, deliver and/or receive that inter-shard transmission is removed; thus control of the resource may be established more quickly and with lower latency, more robustly, more inexpensively, and more securely.

By removing the need to send a transmission, such as a control-granting transmission between two shards of a data structure, the need to establish a connection between two shards (i.e. between the two parts of the data structure) in order to establish control of the resource with the second party is removed. Potential transmission issues, such communication delays, noise, or bandwidth requirements are reduced or eliminated. Eliminating the need to receive a transmission between two shards also eliminates the risk of incorrect ordering of the data in that transmission and of data congestion. Further, the fault tolerance of the system is improved because a reduced number of components are involved in the establishment of control of the resource with the second party. Control is able to be established by the actions of one shard.

The removal of the need to send transmissions or communicate between any pair of shards in order to establish control of the resource with the newly-controlling party also aids in the parallelisation of the method and system. No inter-shard transmissions need to be prepared, sent, received, and acknowledged in an atomically committed manner between the first shard of the data structure and the second shard of the data structure, and thus the second shard is able to operate independently of the first shard and vice versa. Consequently, the necessity for cross-shard interactions for any reason whatsoever is removed, without compromising the security features that innately arise in the data structure. For example, when the data structure is a distributed ledger, the anti-tampering and security features of the distributed ledger are preserved. Additionally, the removal of the need to send transmissions between any pair of shards also affords the flexibility to scale the method and system whilst preserving the same security features. Although an example including first and second parties and first and second shards is outlined below, the same method and system may be implemented between the first party and a third party associated with a third shard etc. and between the first party and an nth party associated with a nth shard in similar fashion.

Further, in respect of information security, the decrease in data traffic naturally reduces the opportunity for a third party to gain access to the information or control powers contained in the associated data. Since fewer references to or copies of the data are produced as part of establishing control with a second party, the security of that data and the control powers over such data or contained within the data is increased. Additionally, the reduced inter-shard transmission and data traffic or communications between the first shard and the second shard reduces or prevents entirely the risk of interception of that communication by another entity, thereby reducing the risk of data falling into the wrong hands. These security benefits arise because of the reduced opportunities that are available to third parties that might seek to intercept the inter-shard transmissions or communications, or to gain control of one or more of the copies of the data or control powers contained in those transmissions or communications.

Establishing control of the newly created resource with the second party occurs without requiring one or more processor(s) on the second shard, or on any other shard (other than the first shard) to be involved, thereby eliminating the need for multiple copies of the information or control-granting object to be embodied in data or otherwise (even temporarily) on other shards. Reducing the number of copies of the data or control-granting object increases the security of that data or object and thereby the information or control powers it contains because it reduces the possibility of a third party gaining access, since the third party may find that information in fewer places.

In general, the resource may be a public resource or a private resource, fully so or partially. The resource may be confidential or may contain confidential or sensitive information or control powers, may be encrypted, and may include information that needs to be kept secure, either for a limited time, or indefinitely. The resource may be a document, such as a webpage or database entry, and may be an official resource such as an official document (e.g. a vaccination passport, a driving license, a visa) or a financial resource (such as a currency or currency-like token), or some other resource from which a benefit is produced (such as an event ticket, or e-certificate, or token) through controlling or owning or deploying it in a particular context. The resource may be reusable and may be personal to the first party or to a second party or to a particular group of entities. In each instance, a single resource exists only in a single valid copy and may include an identifier.

The publishing of a record occurs to the first shard of a data structure such as a distributed ledger. The record may include one of more of an indication of the identity of the first party, and indication of the identity of the second party, a timestamp, metadata relating to the resource and an identifier or serial number. Other parameters may also be included, as may a hash of any of the preceding records that exist, and a hash of the data included in the record. The publishing of the record creates the resource for the use of second party and places that resource under the control of the second party by ceding/granting access to the information contained in, the control powers conveyed by the resource in favour of the second party.

Prior Art Example: Establishing Control of a Physical Ticket

Figure 1:
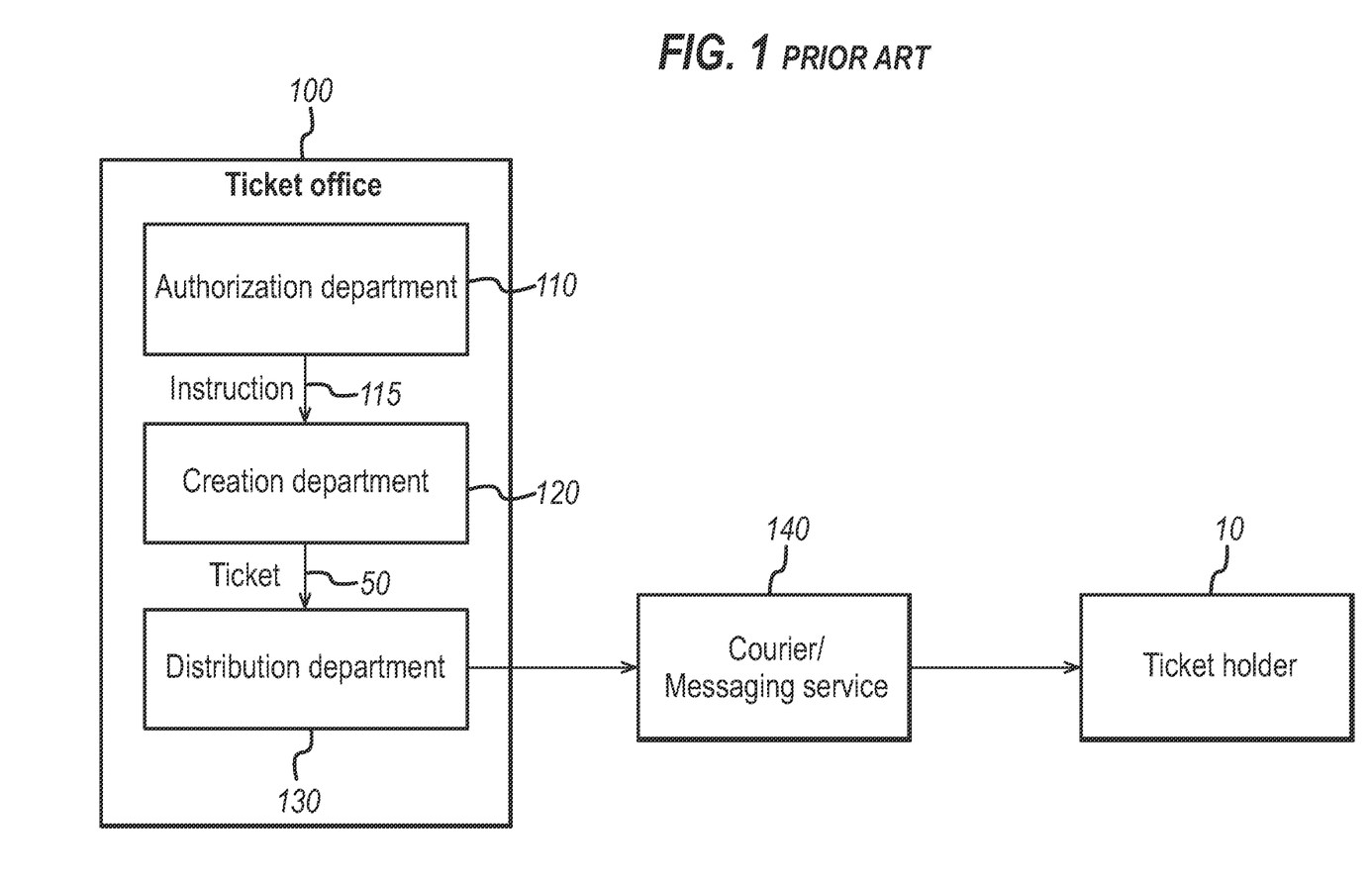
FIG. 1 is a block diagram representing a method of establishing control of a resource according to the prior art.

In order to provide context to the present invention, an existing prior art system that is used for establishing control of a resource, such as a physical ticket, is outlined in FIG. 1. In the scenario, the ticket may be, for example, a ticket for an event such as for a concert. Fake tickets provide a risk to a potential ticket holder who might arrive at a venue and find that, upon presenting the ticket physically to an event attendant, the ticket he or she has purchased is invalid or counterfeit or corrupted. Additionally, failed delivery or interception of a ticket prevents the ticket from being realised as a resource to the ticket purchaser.

As will be appreciated, the following scenario is illustrative of a common means of distributing a resource and of establishing control of that resource with a particular party. The fact that the resource is a ticket to an event should not be seen as limiting.

A valid ticket is a resource because it enables the ticket holder to pass through the entrance to a venue on the basis of the information contained therein and enables the ticket holder to exercise control over the resource, since he or she may present the ticket for admission. The ticket holder is able to dispose of the ticket by using the ticket at the entrance to the venue, in exchange for the admission.

In the ticket scenario, when purchasing a ticket, an individual provides personal information to an event organiser (e.g. the ticket office 100), often by purchasing the ticket at a ticket office in person, by telephone or via a website. The personal information may include but is not limited to the name of the individual involved, his/her address, a QR code or one or more financial details etc. Each of these pieces of information may be sensitive and potentially confidential information which a fraudster might seek to obtain, for example for the purposes of identity fraud. By making a purchase, a second party (the ticket purchaser/future ticket holder 10) is requesting the creation of a resource, by the first party (the ticket office 100).

It is assumed throughout this prior art example that the purchaser's information is confidential and is both "secure" and "safe" whilst within the confines of the ticket office 100.

Upon receipt of the purchase request, the ticket office 100 processes the purchase and if the purchase is deemed to be in order, authorizes the issuance of a ticket. The decision may be made by an authorizing officer or department 110, or may be made by a computer on the basis of an authorising algorithm that checks and identifies a valid purchase, or be arrived at otherwise.

Once authorized, the ticket is created by the ticket creation department 120 upon receipt of an instruction to create the ticket 115 from the authorization department 110. Various steps of fabricating or instantiating the ticket are then undertaken, and typically, various security features are provided on the ticket, such as a hologram or a watermark. The ticket may include the event details, and may be personalized to the purchaser, and thus embody personal data. Once the ticket 50 has been created, it is sent from the creation department 120 to the distribution department 130, where it is processed for distribution to the future ticket holder 10.

Although the authorization department 110, creation department 120 and distribution department 130 are shown as three distinct departments in FIG. 1, any one or more of the authorisation, creation and distribution departments may be the same or effectively the same, and one or other, or both of the instruction 115, and the transfer of the ticket 50 may be internal to a single department. Any transfer of the purchaser's information within or between departments of the ticket office 100 is deemed to be secure.

Until the point that the ticket 50 arrives with the ticket holder 10, control of the ticket 50 has not been established with the ticket holder 10. Inside the ticket office 100, the ticket is under the control of the creation department or system 120 or the distribution department or system 130. However, once the ticket 50 has been sent but is yet to arrive with the ticket holder 10, the ticket is in the possession of the courier 140 (who may or may not have useful control of it), or other equivalent mail or messaging service. At a later point in time, the courier 140 passes the ticket 50 to the ticket holder 10 by delivering it. In this prior art example, the point of passing the ticket 50 to ticket holder 10 is the action that establishes control with the ticket holder 10 of the ticket and of any personal information or further control powers therein. Throughout this sequence, the ticket 50 as a resource, and the information or further control powers contained therein, may be under the full or partial temporary control of whoever is in possession of the ticket 50 at that time in this scenario. As a consequence of the delivery sequence, there is therefore a delay in establishing control of the ticket 50 with the ticket holder 10, and the control over the ticket 50 as a resource is either in limbo during this delay, or it is partially or fully with neither the ticket holder 10 nor the ticket office 100.

Whilst these existing systems work without issue in some cases, the process of establishing control of the ticket with the ticket holder poses a series of information and control security problems. In some instances, a fraudster might access the newly created physical ticket 50 as it leaves the distribution department 130 of the ticket office 100. In other instances, a fraudster might intercept the ticket in transit with the courier or messaging service 140, or might intercept it at one of the courier's sorting or routing offices. Although the ticket 50 is not necessarily a resource to the courier 140 because he or she may not use it to pass through the entrance to the venue (e.g. if the ticket 50 is personalized to the ticket holder 10), if a fraudster intercepts the courier 140 and gains access to the ticket by any means, the information or further control powers recorded therein may become the subject of future fraud.

In addition to the security risks above, prior art systems also suffer from bottlenecks. Tickets for events are typically limited and are only available within a short time window before an event is 'sold-out'. In many instances, tickets are also released at a specific time on a specific day and there is often a huge influx of prospective ticket holders simultaneously trying to purchase tickets to an event at the specific time (e.g. from multiple ticket booths or ticketing offices). Even if the purchase is being made online or via a call centre, prospective ticket holders are often held in a queue or are placed 'on hold' whilst purchases are dealt with. When high volumes of tickets are being simultaneously purchased, the processing of ticket purchases may provide difficulties. In such scenarios, agents often use a centralised ticketing database, but it remains challenging to ensure that this database is kept sufficiently up-to-date in scenarios where there is a huge influx of prospective ticket holders. During such sales, each ticketing agent must communicate with the centralised ticketing database. Such communications take time and consume computing resources, and in some cases, the multiple simultaneous accesses to update the central database can result in the same ticket being inadvertently sold twice by two separate agents at the same time, due to communication delays or disruption.

Prior art systems mitigate against the risk of the same ticket being sold twice by processing purchases sequentially one by one or alternatively certain tickets must be allocated to specific ticketing offices (which may lead to one office or vendor selling out whilst the other still has tickets). The greater the number of ticketing agents, the greater the communication with the central ticketing database and the more difficult keeping an up-to-date central ticketing database becomes due to the need for communications between the ticketing offices, agents, and the central database. Hence, whilst the existing systems work to some extent, these systems can be difficult to operate in parallel because the rigid sequence of purchases must be maintained, and to scale for large numbers of simultaneous accesses to the central ticking database.

Prior Art Example: Establishing Control of an Electronic Ticket

Whilst described above in the context of a physical ticket, the situation is no different even in the alternative scenario where the resource is not a physical ticket, but rather is electronic (for example, an e-ticket, e-certificate or similar). The establishment of the control of that resource by sending the resource via email, text message, secure message, or via electronic rather than physical means, provides analogous security issues. The resource, the information and further control powers secured therein must still be transmitted between the first party and the second party who receives the resource, before control of it can be established with such a second party, leaving that transmission prone to interception by a malicious parties or exposed to corrupting transmission channel noise. Even if the information is encrypted, such information may be decrypted or fraudulently altered by the malicious party. Furthermore, and analogous to the physical delivery network operated by the courier 140, a third party, such as an email service provider, must be relied upon to (temporarily) take control of the e-ticket or similar on its passage between the ticket office and the ticket holder. Additionally, the same ticket processing challenges occur in the rapid issuance of large numbers of tickets in a short window of time also occur and the bottlenecks exist due to the need for multiple simultaneous accesses and updates to a single centralised ticketing database.

Establishing Control of a Ticket According to the Present Invention

The secure establishment of the control of a physical or electronic ticket with a purchaser is one example where the present invention provides fundamental improvements especially with regards to the security, the latency, and the risks of passing control over a resource from one party to another in a sharded data structure such as a distributed ledger. In contrast to the prior art schemes explained in connection with FIG. 1, the scheme of FIG. 2 provides such improvements. It will be appreciated that whilst this ticketing context forms an example of the method and system for securely establishing control of a resource, the features of the ticket related example may be applied to different types of resources using the same system architecture, principles, and data structures.

As will be outlined in greater detail in the following, the present example involves the creation of an electronic ticket on a shard of a distributed ledger instantiated at and primarily used by the ticket office after purchase. This creation is done in a way that (a) the control of the created ticket resource lies at once with the purchaser, and (b) that these control powers do not have to go through any chains of custody or other forms of risky transmission or intermediation by one or more third parties or outside the ticket office's primary shard. This means that the purchase of the ticket and the establishing of control over this resource with the purchasing party both happen on the same shard of the ticket office, as opposed to needing to have any operations on more than one shard of the distributed ledger to effect the desired secure transfer of resource control.

When a ticket holder wishes to exercise the control of her or his ticket for example, at the entrance to a venue, she or he is able to do so by interrogating the shard containing the record using a computer, laptop computer, smartphone, PDA, tablet, phone, or any similar device that is in her or his possession. Using his or her device, the ticket holder conducts a query on the shard of the distributed ledger that resides in the ticket office shard for her or his ticket, via a network such as the internet, in order to access the relevant cryptographically secured to details of the ticket that make it possible to enter the venue.

Figure 2:
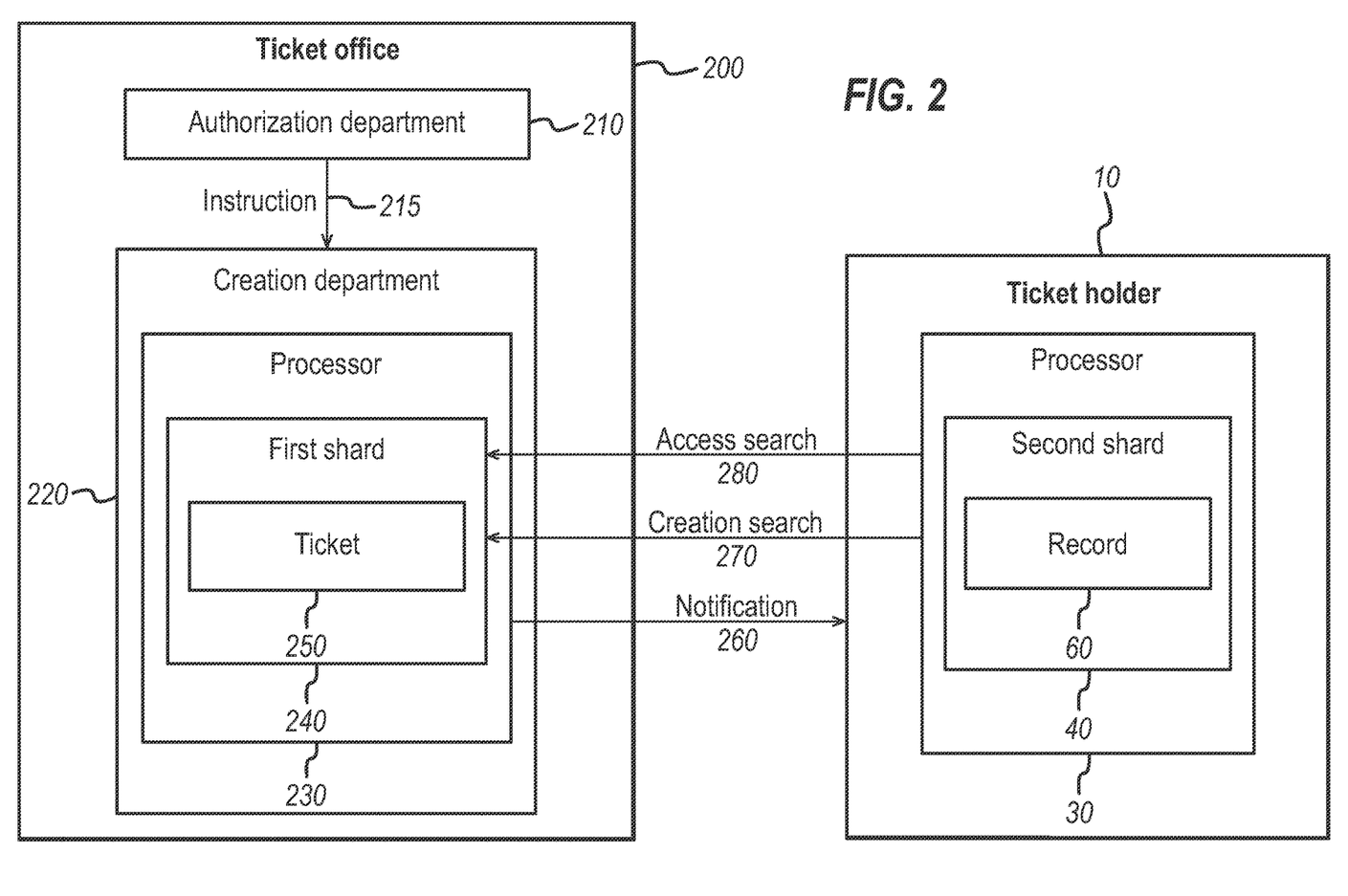
FIG. 2 is a block diagram representing a method of securely establishing control of a resource according to the present invention.

With reference to FIG. 2, a purchaser, who is the prospective electronic ticket holder 10 and a second party, applies to the ticket office 200 for a ticket, supplying the necessary information to the ticket office 200 during the purchase. If the ticket application is deemed to be in order, the authorization department 210 authorizes the issuance of a ticket to the purchaser. In addition to the purchase details, such as for example the name, address etc., the purchasing process may also include the process of generating a public-private key pair for the ticket holder. The decision to issue a ticket may be made by an authorizing agent or department 210, or it may be made computationally on the basis of an authorising algorithm that checks and identifies a valid purchase. In this scenario, the ticket office 200 (or one of its departments, or agents thereof, or a contractor working on behalf of the ticket office) may be considered to be the first party, and the purchaser/future ticket holder 10 is considered to be the second party.

Having authorized the issuance of a ticket, the ticket office 200, acting as the first party, issues an instruction 215 that will ultimately result in the creation of a ticket 250 on a first shard 240 of a distributed ticket ledger that is instantiated on at least one processor 230, the processor 230 typically residing in a computer/server. The creation of the ticket 250 occurs in the creation department 220. The creation department 220 may be within the ticket office, or may be a computer of a contractor working on behalf of the ticket office who is able to receive secure instructions 215 from the authorization department 210. The ticket office 200 (and the contractor if present) are considered to be within the secure perimeter within which the purchaser's information is considered "safe" and "secure" (cf. ticket office 100 above). Although a shard 240 of a distributed ticket ledger is referred to in this example, a different form of distributed ledger data structure (and shard thereof) would also be possible.

The instruction 215 issued by the authorization department 210 comprises the purchaser's real or pseudonym identity and possibly other details, and may further include an identifier that indicates that the instruction originated with the authorization department 210, possibly at a specific computer within the authorization department 210. In other instances, it may be sufficient to check that the instruction 215 originated within the ticket office 200. The instruction 215 may itself be cryptographically protected as an additional layer of security.

Upon receipt of the instruction 215, the processor 230 may, before the creation step, perform an algorithm to validate the origin of the instruction 215 thereby reducing the possibility of resource creation occurring from an invalid instruction. If the instruction 215 was previously encrypted the processor 230 may begin by decrypting the instruction.

Some methods of validation include an inspection or check of the instruction for the presence of an identifier (possibly a unique identifier), such as a digital signature that identifies one or more of the time, location, and the computer from which the instruction 215 originated. In other instances, a different parameter, present in the instruction 215, is checked. In one example, the computer or processor in the authorization department 210 responsible for issuing the instruction 215 may append or insert an indelible identifier on the instruction 215 that identifies the origin of the instruction 215 as being at that processor. That origin may then be checked against a list or database of 'allowed' origins. Alternative mechanisms for the processor 230 to validate that the instruction originated from the ticket office 200, and not from another party, can be used. Validating the origin of the instruction 215 increases the security of the ticket issuance process.

In some instances, a separate processor on a first shard 240, different to the processor 230, performs the validation step upon arrival of the instruction or upon request of processor 230, once the processor 230 has received the instruction, the separate processor thereby acting as an intermediary and filtering instructions to the processor 230. If an instruction is found to be invalid, that instruction may be recorded and reported to a security department within the ticket office, or for example to a law enforcement agency.

In addition to or in lieu of the validation of the origin of the instruction 215, the processor 230 may verify that the instruction has a digital signature of the agent of the ticket office 200, or of the computer (acting as the agent) within the authorization department 210, to confirm that individual or computer is authorized to and/or competent to issue an instruction to create the ticket. Checking to ensure that the first agent or computer has the authority to execute the method determines a quality of the agent or computer, separate from the confirmation of the origin of the instruction 215. The methods of verification are similar to the methods of validation of the origin of the instruction 215, but rather than checking where the instruction 215 came from, the verification checks who issued the instruction 215. This may be achieved by appending or including within the instruction 215 an indelible indication of the credentials of the agent/computer responsible for the authorization. Further, the authorization may be contingent on all the necessary checks being complete, to ensure that the agent/computer is competent to issue an authorising instruction 215. The verification includes an interrogation of the instruction 215 or of its contents for the presence of an identifier, such as a digital signature that identifies the authorization agent or the computer responsible for authorizing the sending of the instruction 215 to create the ticket. In one example, the verification may include checking the digital signature against a list or database of authorized entities, although other mechanisms of verification of the identity of who issued the instruction are possible. The verifying prevents an unauthorized party from instructing the processor(s) to create a counterfeit ticket.

In some instances, a separate processor, different to the processor 230, performs the verification step upon arrival of the instruction or upon request of the processor 230 once the processor 230 has received the instruction, the separate processor thereby acting as an intermediary and filtering instructions to the processor 230. If an instruction is found to be unverified, that instruction may be recorded and reported to a security department within the ticket office, or for example to a law enforcement agency.

In some instances, the same processor responsible for validating the origin of the instruction 215 is also responsible for verifying who sent the instruction. The validation and verification of the instruction 215 may be particularly relevant if the ticket is sold by a third party distributor, to ensure authenticity of the instruction 215.

After a successful validation and/or verification of the instruction 215, the instruction is used by the processor 230 to create a ticket 250. As shown in FIG. 2, the processor 230 is part of a first shard 240 of a distributed ticket ledger that is instantiated thereon. The processor 230 creates the new ticket 250 as a resource for the ticket holder 10 by publishing a record to the first shard 240 of the distributed ticket ledger. This publication of the record on the blockchain creates the ticket 250 as a resource for the ticket holder from the information previously provided so that, at the point of publication, the control powers associated with that information that enable it to be a resource for the ticket holder (such as the fact that the ticket is for an event and confers on the ticket holder the ability to gain admission to the event) are established with finality with the ticket holder on the distributed ticket ledger shard 240 inside the ticket office 200. The ticket resource 250 is available for the ticket holder to control from the moment of its publication, thereby enabling the ticket holder to make use of the ticket 250 at her or his discretion.

The published record may include an identifier, as well as some or all of the pieces of information supplied by the purchaser, such as the purchaser's name, which may be included in the metadata of the record. Other parameters may also be included in the metadata, such as an indication of the ticketing authority granting the ticket, and the event and venue details. The record may also include an indication of the validated origin of the instruction 215 to create the ticket, and/or may include an indication of the authorized agent or computer whose instruction 215 was verified. Additionally, the record may include a hash of the record and all of its contents, which includes the data referred to above, alongside the hash of the previous block in a blockchain, thereby ensuring blockchain security is available for each of the published records. Since by design a blockchain is resistant to modification of the data contained therein, a persistent and secure record of the creation of the ticket as a resource for the ticket holder on the first shard may be provided. Further, the resource is created without the need for interaction with any other shard.

The first shard 240 to which the newly created ticket resource 250 is appended may include a series of existing ticket resources. The first shard 240 may include old tickets for the same purchaser, which have expired, been used in past events or which have been discontinued for other reasons. Each of these resource records may be encrypted so that only the respective ticket holder, such as ticket holder 10, in possession of the decryption powers, may decrypt each record's contents. Alternatively, the first shard 240 may include other plaintext or encrypted data relating to the ticket holder.

Alternatively, rather than encrypting individual entries in the distributed ticket ledger within shard 240, access may be controlled at the shard level. Since the shard 240 may contain only resource records (in this instance, tickets) belonging to a single party, access to the whole shard 240 may be granted exclusively to the same ticket holder 10. In this scenario, access to the shard may be governed by processor 230 running a verification algorithm that permits it to act as a 'gatekeeper', performing a verification algorithm on each request for access to the first shard 240 in order to determine whether such access should be granted.

As a further alternative, the first shard may include multiple resource and other records of different tickets for different ticket holders, each encrypted and identifiable only to their own respective ticket holders. Each of these records may be encrypted and may be encrypted using a different public-private key pair or similar, so that only the respective ticket holder, such as ticket holder 10, in possession of the correct private key, may decrypt a particular record's contents and thereby gain access to the information and the ability to control that information that is contained therein.

In a further alternative, the creation of the new ticket resource 250 may also include the instantiation of a new shard 240 on the processor 230, instantiated before or at the moment of creation of the ticket 250. In such a scenario and if a blockchain is used to secure the distributed ticket ledger, a genesis block may be generated upon instantiation of the shard in order to include information associated with the shard such as system parameters and to permit the ticket record to include the hash of the genesis block.

Upon creation of the ticket 250 by means of the publishing of the record of the ticket to the first shard 240, the ticket becomes a resource for the ticket holder 10 to use. In contrast to existing methods as explained in connection with FIG. 1, whereby the ticket 50 must then be sent by courier 140 to the ticket holder 10 for the ticket holder 10 to use, in the system of FIG. 2, the ticket 250 exists as a resource for the ticket holder upon the moment of publication of the record on the first shard 240 (in fact, before the ticket holder 10 may even be aware that the ticket has been created). One advantage of this method of establishing control of a ticket is that the created ticket 250 may not be intercepted in transit between the processor 230 and the ticket holder 10 because no such transmission is required. Consequently, no interception by a fraudster is possible. In addition, an immediate record (which may be tamper-proof, persistent, and overt) of the creation of the ticket 250 is made as a result of publishing the ticket as a record on the first shard 240 of the distributed ticket ledger. Further, if the ticket is suitably encrypted, for example with a public-private key-pair, only the ticket holder has the private key needed to review the contents and take control of the ticket, thereby providing an additional level of security.

At the point of publication of the record to the first shard 240 the ticket holder 10 does not necessarily know that the ticket creation has been completed. For example, the ticket holder 10 may confirm the purchase of the ticket. After that point, there may be some internal processing time in which processor 230 within the ticket office 200 prepares the ticket 250, between the moment of purchase and the moment of publication of the record on the first shard 240. However, upon the moment of publication, the ticket, and any information contained therein (which may be personalized) and any control powers associated with that ticket become available to the ticket holder for use from that moment on because the ticket holder could (in principle) use the ticket at his or her discretion as soon as it is published. Hence, control of the ticket as a resource to the ticket holder is established upon publication to the first shard 240. No further or intermediate steps are required in order to establish control of the ticket 250 with the ticket holder 10. After creation, if the ticket holder 10 inspected the first shard 240, the ticket 250 would be ready for use.

As a result of the above, in the system and method of FIG. 2, the control over the ticket 250 (once it has been created upon publication) is established with the ticket holder 10 without the cooperation or consent of another entity (in fact, without even the cooperation or consent of the ticket holder 10). This contrasts with the situation in FIG. 1, and the prior art, where the establishment of control of the ticket 50 as a resource requires that it first be shipped via a third-party courier 140 to the ticket holder 10 and where the ticket holder 10 has no control over the ticket during the period of shipment, until that ticket 250 is delivered. Similarly, in the prior art case of the electronic resource (such as the e-ticket for example), receipt of the resource (e.g. via email) is required in order to use the resource, and in each case, the ticket must be communicated to the ticket holder 10, thereby increasing latency and risking the interception of that communication by a third party.

As a further advantage, the publication of ticket 250 to establish control of a ticket for the ticket holder 10 does not require any communication between shards. Instead, each shard may operate essentially independently of each other in respect of the creation of tickets. Such an architecture is valuable in scenarios where a high influx of purchases are expected, since the distributed ticket ledger (or other blockchain or similar data structure) may be sharded. Strictly no inter-shard communication is required whilst control of the ticket 250 is established with the ticket holder 10. Control of the resource does not have to be transmitted to another shard. Additionally, no computing resources need to be dedicated to such inter-shard communications. Thereby for the purposes of establishing control of the ticket 250 with the ticket holder, both the parallelisation and scalability of the system is improved without compromising the security.

Although not required to establish control of the ticket, once the ticket 250 has been created, an indication, such as notification 260, may be sent by processor 230 to the ticket holder 10 that the ticket 250 has been created and is already under the control of the ticket holder 10. The notification 260 may be in the form of an email, a secure message, a letter, a phone call, an automated phone call or other communication that is sent to the ticket holder 10 to indicate that the ticket 250 is ready to be used. The notification 260 itself may be encrypted such that the notification is only able to be decrypted by the ticket holder 10. Upon receipt of the notification, the ticket holder 10 becomes aware that the ticket is available to be used. Whilst this notification 260 may be sent by any conventional means, none of the sensitive information recorded in the ticket 250 is necessarily contained within the notification 260, so even if the notification is intercepted, no information is available that enables identity fraud to occur, contrasting with the situation whereby a ticket 50 is itself distributed by a courier 140 or by email. Alternatively, it is possible that the ticket holder 10 is aware of the availability of the ticket prior to receiving the notification.

In prior art methods, a data object only becomes a resource for a second party once this data object and the control over it are created and then transmitted to and firmly lodged with the intended second party. In these cases, the step of transmitting a data object and the control powers over it (both needed for the creation of a resource) to the second party precedes the step of finally establishing the data object as a resource. This means in particular that control transmission has to flow through intermediary parties or remain in limbo for some time. Prior art methods in the field of this invention operate along the sequence of (1) 'creating data objects', (2) 'transmitting data objects' or messages of them and (3) 'establishing control over data objects as resources with a second party'. The present invention fundamentally changes the sequence to (1) 'creating data objects', (2) 'establishing control over data objects as resources with a second party' and (3) 'notifying a second party of their effective control'. Despite the fact that control is constitutional for a data object to become a resource, with prior art methods in the field of this invention this very control is put at multiform risks (illustrated by way of some examples above), subjected to unnecessary latencies that cannot be cured fundamentally by ever increasing computer hardware speeds, subjected also to chains of custody, and principally such that distributed ledgers and their associated blockchains cannot be efficiently sharded and therefore scaled in the first place. By contrast, in the present invention, establishing the control over a data object with a second party and thus creating the resource comes before any communication, notification, transmission or similar steps, because it is done on a first shard of a first party and not a second shard of a second party. These approaches address the cited shortcomings of the prior art.

In some instances of the present invention, the notification 260 may be sent by a different processor other than processor 230, for example by a further processor within the ticket office 200 that runs an algorithm to 'observe' the publication of the records to the first shard 240. The further processor may monitor the first shard 240 for changes, either periodically or on demand, and may send notification 260 whenever a change is provided. Advantageously, when the records on the shard of the distributed ticket ledger are persistent and secure, any change to the data in the ticket 250 will result in a change in the hash of that data, which will be immediately apparent to the processor running the 'observing' algorithm, or any other observing entity.

As a further alternative, the notification 260 event above may instead arise as a side effect of the publishing of the record and creating ticket 250, and advantageously may require no further processing or computation by processor 230, for example, if the ticket holder 10 or other entity is an 'observing' party that observes the contents of the first shard 240.

As an alternative or in addition to sending a notification 260 to the ticket holder, the ticket holder 10 may conduct a periodic or on-demand creation search 270 of the first shard 240 with the purpose of seeing whether the ticket 250 has been created, using a device under his or her control, such as processor 30. He or she may execute a search algorithm on processor 30 to search the records that have been published on the first shard 240 of the ticket blockchain on the basis of one or more of the timestamp, an identifier such as a serial number, and a different parameter, or may search the metadata for entries that include his or her name or another piece of information that identifies the ticket holder, e.g. a cryptographic pseudonym. If a creation search 270 indicates that a ticket has been created, a notification may be sent to ticket holder 10. As with notification 260, the notification does not include informational content of the ticket, but rather comprises an indication of the existence of the ticket 250 as a resource controlled by the ticket holder.

In order to permit the creation search 270 of the first shard 240, the processor 230 may verify the request received from processor 30 executing the search algorithm. Alternatively, a separate processor may run the verification routine to filter the requests to processor 230 to be only those search requests that are verified.

After creation of the ticket 250 on the first shard 240 and regardless of whether or not a subsequent notification was sent to the ticket holder 10 and whether or not a creation search 270 has occurred that would indicate to the ticket holder 10 that the creation of the ticket 250 is complete, when the ticket holder 10 wishes to use the ticket 250 to enter a venue this may be achieved, for example, by an algorithm executed by processor 30.

Processor 30 is comprised within a computer, smartphone, PDA, tablet, or any similar device that is in possession of the ticket holder 10 at the point at which the ticket needs to be used. The processor 30 may have instantiated thereon a second shard 40 of the distributed ledger, or it may be connecting to a second shard as part of the distributed ticket ledger.

The processor 30 may execute an access search 280 in order to use the ticket 250. In practice, access search 280 may be the same search routine as creation search 270 that is used to indicate to the ticket holder 10 that the ticket 250 has been created. However, the access search 280 is initiated on an ad-hoc basis by the ticket holder 10 (or by another entity) when he or she wishes to use the ticket 250, rather than to determine whether or not the ticket 250 has been created or not. Access search 280 may search the records that have been published on the first shard 240 of the distributed ticket ledger on the basis of the timestamp, the identifier such as a serial number, a different parameter, or may search the metadata for entries that include his or her name or another piece of identifying information, e.g. a pseudonym. Access search 280 may be used to retrieve the information from the ticket 250 in order that the ticket holder 10 may use it to enter a venue. In some examples, each use of access search 280 causes a record 60 to be published to the blockchain on the second shard in order to provide an immediate, secure, persistent, and overt record of the access of ticket 250.

If no record (i.e. no ticket 250) has been created at the point that a creation search 270 or an access search 280 is executed, an algorithm may be run to send a further notification to indicate this to the ticket holder 10.

Figure 3:
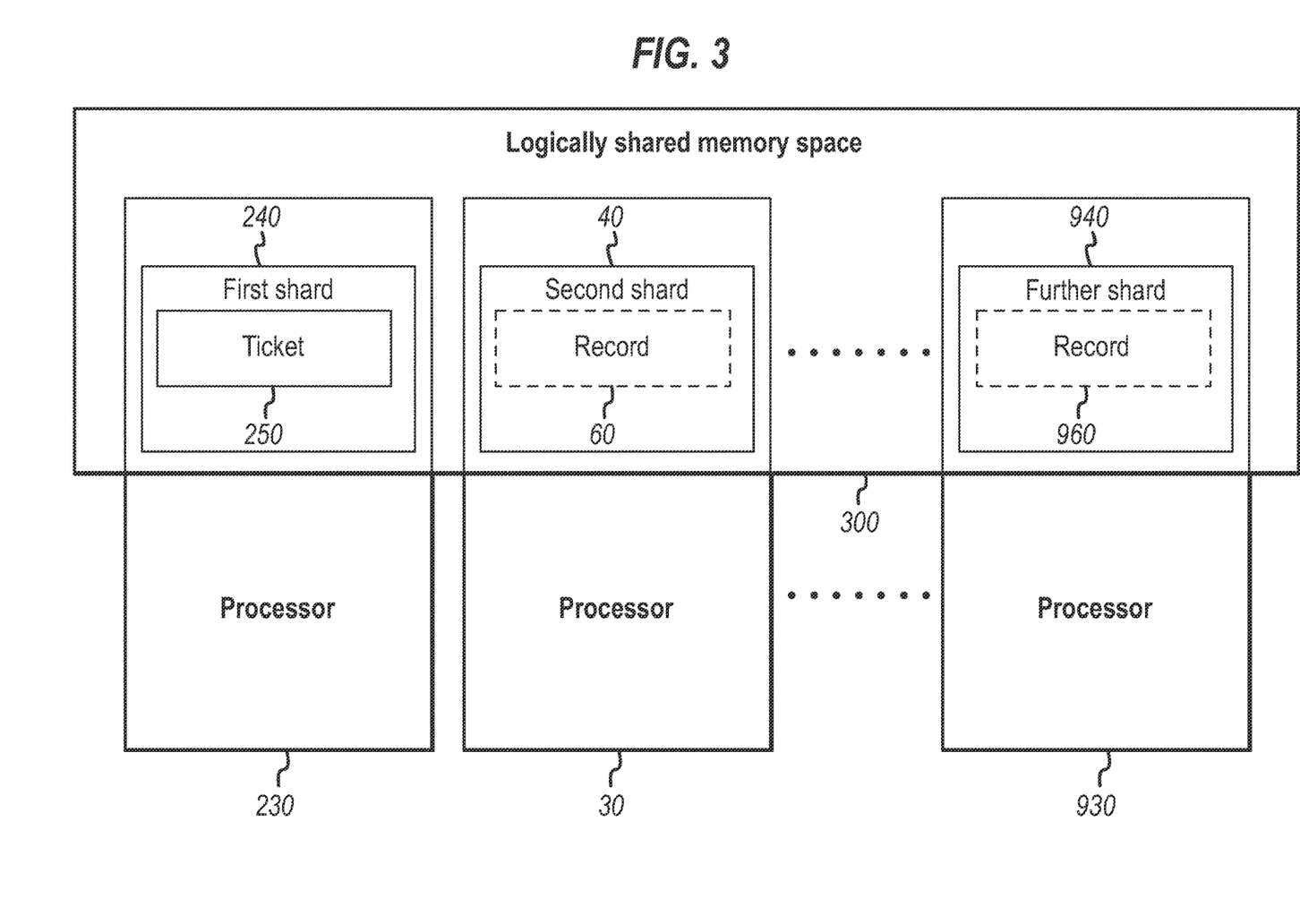
FIG. 3 is a block diagram representing an implementation according to an embodiment of the present invention

One implementation in which creation search 270 and access search 280 may be used is when each of the first shard 240 and second shard 40 are instantiated on a shared logical memory space 300, as shown on in FIG. 3. In shared memory space 300, ticket 250 is located at a common memory address accessible (at least temporarily) by processor 230 and by processor 30 (this may also be the case for record 60, if such records are present). Shared memory space 300 may take the form of any memory space that is accessible by both processors 230 and 30, for example a server memory hosted at the ticket office 200, or a cloud-based system hosted in a secure environment. Accesses to the shared memory space 300 may be monitored, and each access may be verified, and conflicts resolved before the access is granted. Each access to the shared memory space may be recorded on a shard, such as the first shard 240 or the second shard 40, or on another shard of the distributed ledger.

In some examples, more than first shard 240 and second shard 40 may be present, such as one or more further shard(s) 940 instantiated on one or more further processor(s) 930. The further processor 930 may operate in the same fashion as first processor 230, or in the same fashion as processor 30. Alternatively, processor 930 may operate in a different manner. The further shard 940 instantiated on processor 930 may also have access to shared memory space 300. The further shard 940 may have further records 960 published to it.

In other alternatives, some shards of the distributed ledger may have access to the logically shared memory space, whilst others do not. In some instances, the level of access each shard has to the shared memory space 300 may differ, depending on specific permissions given to each shard.

Establishing Control in Other Scenarios

Whilst the resource in the above example is an electronic ticket, the advantages of the present method and system of establishing control of the resource with the second party are not restricted to the ticket scenario. Another scenario whereby the advantages may be derived in the establishment of control of an official document, such as a vaccine passport. In such a scenario, the applicant seeks a vaccine passport from the official healthcare authority. The healthcare authority confirms that the applicant has been vaccinated and publishes, to the first shard (cf. first shard 240) a vaccine passport (cf. ticket 250). At the point of publication, the vaccine passport forms a personal resource to the passport holder, which may be accessed by the passport holder using a mobile device. In similar fashion to the ticket scenario, no communication of the vaccine passport (and any associated delays or risks of interception exist), because the vaccine passport exists instead as a record on the shard at the healthcare authority.

Another scenario where the data security and communication advantages are derived occurs in the context of version control for a document, whereby a first version of the document may be present in the metadata of a record instantiated in a first shard under the control of a first user (the first party). Once the first user has completed his or her edits, the first user needs to establish control of the document with a second user (the second party) in a secure fashion. In similar fashion to the ticket example above, the first user may save his or her changes and publish a further record of the document to a first shard instantiated on a first system under his or her control. Upon publication of that record, the control of the document may be established with a second user, thereby creating a resource for that second user, who is able to access that document and make further edits.

A different scenario in which the present invention enables the establishment of control of a resource with a second party occurs when it is critical that the transfer of control from a first to a second party does not pass through a chain of intermediaries. This applies for example to a military defence system jointly operated between allies, where control of a defence resource lies initially with a first party on its system shard of hardware and is then at a later point established by the first party on its system shard as a resource controlled by a second party. Depending on the operational circumstances, the second party may then either keep the resource and the control it embodies on the system shard of the first party, or alternatively, it may transfer it to the system shard of the second party at a time chosen by the second party. In this architecture, effective control of the military defence system is then never interrupted or intermediated, and the anchoring of this control over a multi-sharded decentralised hardware can be adapted as a function of the situational awareness and the controller's needs at the time.

A further scenario in which the data security and communication advantages arise occurs in financial settings whereby control of a currency unit or account needs to be securely established with a second party (for example as a gift or as part of a payment). In this case, the first user (the first party) may hold a currency unit or account resource in a first shard and subsequently pass this currency unit or account resource by creating and publishing on the first shard a resource for the second user (the second party) while extinguishing the resource originally held by the first party. Upon publication of that record, the control of the currency unit is established with the second user, thereby creating a resource for that second user, who is then able to use the currency unit at his or her discretion.

The present invention also provides parallelisation advantages in contexts where time-critical, highly decentralised, and joint or cooperative control transfers within industrial or electronic processes are needed. The ability to transfer with finality a resource from a first party to a second party within the system shard of the first party is the basis for effective parallelisation. For example, in future car traffic management systems, motorcars are networked with one another and with the roadside sensors and traffic reporting systems. Resource and control management in a centrally optimised manner of vehicle routing will generally suffer from computational delays that are inconsistent with the complexity and real-time demands of car traffic. Instead, cars share a finite resource in the form of the road network, they are independent actors that need to negotiate and coordinate the access to various road resources. Such coordination of road resources requires the technical ability to have very high throughput of resource transfers (which parallelisation can scale up to), very low latencies in passing resources between cars and no intermediaries. The present invention addresses these demands.

Further scenarios that seize upon the communication and data security advantages of the method and system for establishing control of a resource with a second party will also be apparent to those skilled in the art, and the individual resources or individual scenarios outlined herein should not be considered as being limiting.

What is claimed:

1. A computer-implemented method of securely establishing control of a resource in a distributed ledger, wherein the distributed ledger comprises a first shard instantiated on one or more first processor(s) of a first system, the first shard configured to respond to an instruction originating from a first party, the distributed ledger further comprising a second shard, the second shard instantiated on one or more second processor(s), the second shard configured to respond to an instruction originating from a second party, the method comprising:

creating, by means of the publishing of a record by the first system, the resource,
wherein the publishing of the record occurs in response to an instruction originating from the first party,
wherein the publishing of the record is to the first shard of the ledger, and
wherein the publishing of the record establishes that control of the resource resides with the second party.

2. The method of claim 1, further comprising the step of validating that the instruction originated from the first party, optionally wherein the validation is by the first system.

3. The method of claim 1, wherein the resource comprises an indication of the identity of the second party.

4. The method of claim 1, wherein
the first shard includes one or more record(s) related to the first party; or
the second shard includes one or more record(s) related to the second party; or
both.

5. The method of claim 1, further comprising indicating to the second party that control of the resource resides with the second party.

6. The method of claim 5, wherein the indicating to the second party that control of the resource resides with the second party comprises sending a notification of the publishing of the record to the second party, optionally wherein the sending is by the first system.

7. The method of claim 1, wherein the one or more second processor(s) are comprised in a second system, and optionally, wherein the method further comprises searching, by the second system, the record(s) in the first shard.

8. The method of claim 1, wherein the method of securely establishing control of the resource:
is executed without interaction with any of the one or more processor(s) of the second shard; and/or
is executed exclusively on one or more processor(s) of the first shard.

9. The method of claim 1, further comprising the step of:
verifying that the first party is authorized to instruct the creation of the resource; or
verifying that the first party is competent to instruct the creation of the resource; or
both.

10. The method of claim 1, wherein the first shard and the second shard of the distributed ledger each exist in a shared memory space and the first system is configured to access the shared memory space.

11. The method of claim 1, wherein the distributed ledger comprises a blockchain.

12. The method of claim 1, wherein the distributed ledger is public.

13. A computer program product stored on non-transitory computer readable medium comprising instructions that, when executed, cause one or more processor(s) to perform a computer-implemented method of securely establishing control of a resource in a distributed ledger, wherein the distributed ledger comprises a first shard instantiated on one or more first processor(s) of a first system, the first shard configured to respond to an instruction originating from a first party, the distributed ledger further comprising a second shard, the second shard instantiated on one or more second processor(s), the second shard configured to respond to an instruction originating from a second party, the method comprising:
creating, by means of the publishing of a record by the first system, the resource,
wherein the publishing of the record occurs in response to an instruction originating from the first party,
wherein the publishing of the record is to the first shard of the ledger, and
wherein the publishing of the record establishes that control of the resource resides with the second party.

14. The computer program product stored on non-transitory computer readable medium of claim 13, further comprising instructions that, when executed, cause one or more processor(s) to perform the step of validating that the instruction originated from the first party, optionally wherein the validation is by the first system.

15. A non-transitory computer-readable medium comprising instructions that, when executed, cause one or more processor(s) to perform a computer-implemented method of securely establishing control of a resource in a distributed ledger, wherein the distributed ledger comprises a first shard instantiated on one or more first processor(s) of a first system, the first shard configured to respond to an instruction originating from a first party, the distributed ledger further comprising a second shard, the second shard instantiated on one or more second processor(s), the second shard configured to respond to an instruction originating from a second party, the method comprising:
creating, by means of the publishing of a record by the first system, the resource,
wherein the publishing of the record occurs in response to an instruction originating from the first party,
wherein the publishing of the record is to the first shard of the ledger, and
wherein the publishing of the record establishes that control of the resource resides with the second party.

16. The non-transitory computer-readable medium of claim 15, further comprising instructions that, when executed, cause one or more processor(s) to perform the step of validating that the instruction originated from the first party, optionally wherein the validation is by the first system.

17. The non-transitory computer-readable medium of claim 15, further comprising instructions that, when executed, cause one or more processor(s) to securely establish control of the resource based on one or more of:
without interaction with any of the one or more processor(s) of the second shard; and
exclusively on one or more processor(s) of the first shard.

18. A system for securely establishing control of a resource in a distributed ledger, wherein the distributed ledger comprises a first shard instantiated on one or more first processor(s) of a first system, the first shard configured to respond to an instruction originating from a first party, the distributed ledger further comprising a second shard, the second shard instantiated on one or more second processor(s), the second shard configured to respond to an instruction originating from a second party, the system comprising a first system configured to:
create, by means of the publishing of a record, the resource,
wherein the publishing of the record occurs in response to an instruction originating from the first party,
wherein the publishing of the record is to the first shard of the ledger, and
wherein the publishing of the record establishes that control of the resource resides with the second party.

19. The system of claim 18, wherein the system is further configured to validate that the instruction originated from the first party, optionally wherein the validation is by the first system.

20. The system of claim 18, wherein the system is configured to securely establish control of the resource based on one or more of:

without interaction with any of the one or more processor(s) of the second shard; and exclusively on one or more processor(s) of the first shard.

* * * * *